H. Schmidt.

Screw Clamp.

No. 3,745. Reissued Nov. 23, 1869.

Witnesses,
J. N. B. Lamartin
Jas. A. Lerow

Inventor,
H. Schmidt
Per Munn & Co
Attorneys

N. PETERS, PHOTO-LITHOGRAPHER, WASHINGTON, D. C.

United States Patent Office.

HERMANN SCHMIDT, OF NEW YORK, N. Y.

*Letters Patent No.* 57,195, *dated August* 14, 1866; *reissue No.* 3,745, *dated November* 23, 1869.

IMPROVEMENT IN HAND SCREW-CLAMP.

The Schedule referred to in these Letters Patent and making part of the same.

*To all whom it may concern:*

Be it known that I, HERMANN SCHMIDT, of the city, county, and State of New York, have invented a new and useful Improvement in Hand-Screw Clamps; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 2:
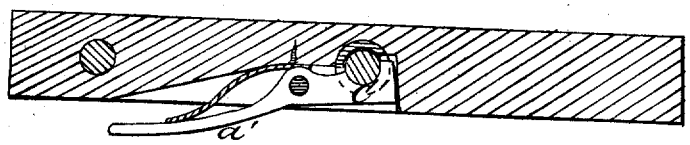
Figure 2 is a horizontal section of the same.
Figure 1:
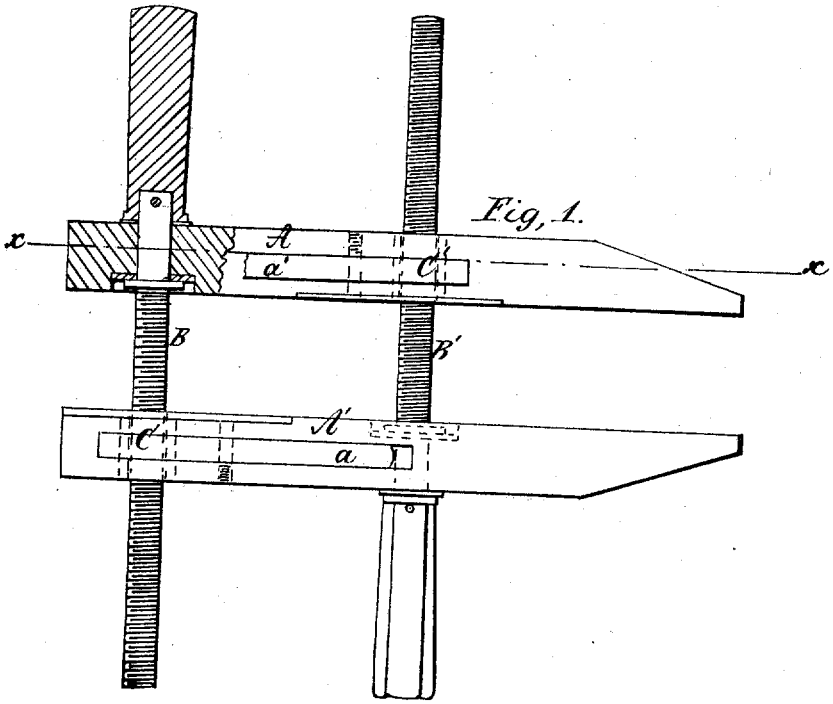
Figure 1 represents a sectional side elevation of this invention.

This invention relates to a hand-screw clamp, the screw or screws of which are provided with a liberating-nut or nuts, in such a manner, that by throwing said nut or nuts out of gear with the appropriate screw or screws, the clamp can be readily and quickly adjusted for different thicknesses of material to which the same is to be applied, and thereby much valuable time is saved.

In the example shown in the drawings, the letters A A′ designate the two jaws of a double screw-clamp.

These jaws are made of wood, or any other material, in the ordinary form or shape, and they are adjusted and compressed by means of two screws, B B′.

These screws are, by preference, made of iron, and the screw B is so arranged that it can turn in the jaw A, but is not allowed to move longitudinally in its socket in said jaw, while its shank passes freely through the jaw A′.

The screw B′ turns in a socket in the jaw A′, but it passes freely through the jaw A.

The nuts *c c′*, of the screws B B′, are formed by semicircular cavities in the end, of spring-levers *a a′*, which are secured to the sides of the jaws A A′, as clearly shown in the drawing; or instead of arranging the nuts in spring-levers, they might be arranged in slides, or otherwise constructed, so that the same can be readily thrown in or out of gear with their screws.

If the nuts *c c′* are thrown out of gear with said screws, the two jaws can be readily moved toward and from each other, and they can be almost instantaneously adjusted to any desired distance, whereas with screw-clamps of the ordinary construction, the operation of adjusting the jaws must be effected by turning the screws in the proper direction, which causes much loss of time.

By making the nuts "liberating," or capable of being thrown in or out of gear with their screws, I am enabled to set my clamp for thin or thick pieces at any moment, and the number of clamps required in a shop can be materially reduced, because, with the present clamp, it is found necessary to have a large number of clamps, so that the clamps generally used for certain articles can remain unchanged, and the time of resetting the clamps is saved.

My clamp can be adjusted to any article without loss of time, and by being enabled to reduce the number of clamps required for a shop, the higher price of my clamp is compensated.

It is obvious that this invention is applicable to single screw-clamps, as well as to double screw-clamps, the advantage derived from the liberating-nut being the same in either case.

What I claim as new, and desire to secure by Letters Patent, is—

A hand-screw clamp, the nut or nuts of which are capable of being thrown in or out of gear with the clamping-screw or screws, substantially in the manner and for the purpose herein set forth.

This specification signed by me, this 11th day of October, 1869.

HERMANN SCHMIDT.

Witnesses:

W. HAUFF,

E. F. KASTENHUBER.